Figure 1:
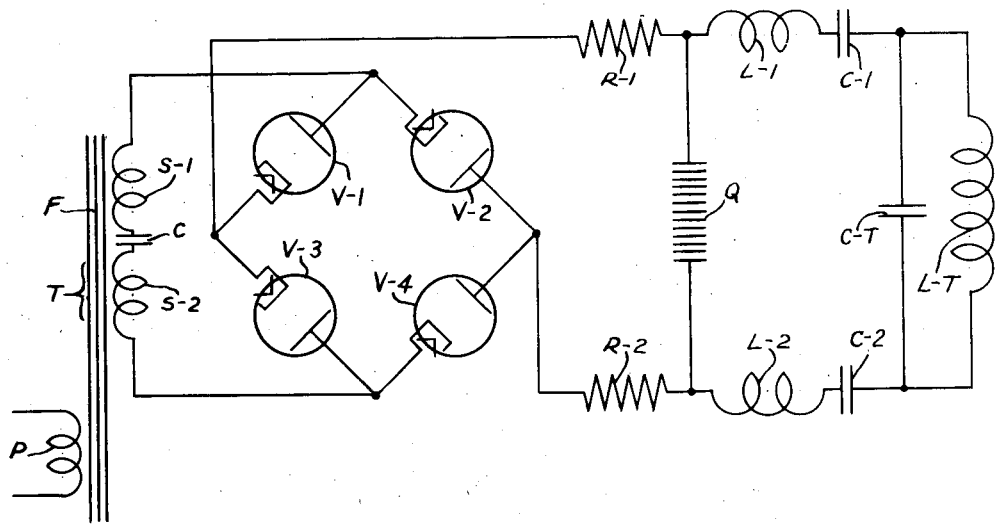

Jan. 29, 1952  O. WEITMANN  2,583,979

OSCILLATOR POWER SUPPLY APPARATUS

Filed Nov. 17, 1948

OTTO WEITMANN Inventor

By

John B. Sponsler Agent

Patented Jan. 29, 1952

2,583,979

UNITED STATES PATENT OFFICE 2,583,979

OSCILLATOR POWER SUPPLY APPARATUS

Otto Weitmann, Cedar Grove, N. J., assignor to Lepel High Frequency Laboratories, Inc., New York, N. Y., a corporation of New York Application November 17, 1948, Serial No. 60,501

7 Claims. (Cl. 250—37)

My invention relates to power supplies for energizing electrical oscillatory circuits.

More specifically my invention relates to electrical circuits for providing a power supply fed from a commercial alternating current source wherein power is delivered to an oscillatory circuit under the control of a quenched spark gap adjusted to operate in accordance with a predetermined set of electrical conditions. An application for a circuit of this type is found in energizing high frequency induction heating equipment, and it is to that kind of equipment that the described mode of the present invention is directed.

It is common practice to energize an oscillatory circuit by means of high voltage alternating current of a predetermined frequency provided from a high voltage transformer having its primary connected to commercially available alternating voltage sources and its secondary coupled by capacitors to an oscillatory circuit composed of lumped impedance; i. e. lumped inductance and lumped capacitance. A spark gap is provided, coupled closely to the circuit in such a manner to furnish a break down path across which the coupling capacitors may discharge, thereby providing a means for periodically producing free oscillations in the circuit. The high voltage transformer may be a high reactance type to withstand the short circuiting effect when the spark gap discharges the coupling capacitors, and protective chokes are usually supplied in the transformer primary circuit.

One objection to the type of circuit above described is that pulse trains, resulting from the said free oscillations and occurring several thousand times each half cycle of the supply frequency, are separated by varying intervals so that successive trains may overlap or may be non-uniformly separated. Consequently interference between successively generated wave trains may occur or poor power conversion may result due to the non-uniformity of the intervals between them. Not only poor electrical efficiency results, but also excessive electrical stress is placed upon the circuit components, particularly the spark gap electrodes, which being rapidly consumed thereby, quickly become out of adjustment. Unless these gaps are frequently adjusted a vicious cycle of the action just described in an intensified degree is set up until finally the equipment fails to function.

Commercially various types of oscillatory circuits similar to that described above are manufactured for use with high frequency induction heating apparatus. Since spark gap operated apparatus requires a large number of charging and discharging cycles per second to realize a predetermined power output, the gaps must be adjusted to discharge at a considerably lower voltage to produce a great number of wave trains during each cycle of the supply frequency when multi-phase supply voltage is employed. Slight errors in the spark gap adjustment result in excessive spark gap currents, and wear as well as excessive peak voltages result. Furthermore when multi-phase supply is employed, the objectionable features discussed above are further intensified so that it becomes economically impracticable to utilize a multi-phase power supply. The above mentioned difficulties are even further increased when it is attempted to drive a single phase oscillatory circuit from a multi-phase supply source.

The principal object of my invention is therefore to provide a power supply for quenched spark gap high frequency converters to be used with either single phase or multi-phase alternating current systems, and which is economical in operation and practicable of design. To achieve this objective, a suitable high voltage rectifying circuit is employed to provide proper voltages for the operation of the quenched gap circuit, as well as to provide a substantially constant power input to the oscillatory circuit under reasonably varying line voltage and load conditions, and which has characteristics for preventing overload conditions when the quenched spark gap discharges.

It is a further object of my invention, to provide a high voltage power supply system which produces wave trains separated by uniform intervals.

Another object is to provide a system for exciting a single phase oscillatory circuit from a multi-phase alternating current supply source.

A still further object of my invention is to provide for a quenched spark gap controlled oscillatory circuit, a power supply system wherein an energizing alternating voltage of one frequency and phase produces substantially the same output efficiency in the oscillatory circuit as an energizing alternating voltage of a different frequency and phase.

Other objects of my invention will be pointed out in the description which follows and in the accompanying drawing by way of illustration, my invention being further set forth in the appended claims hereinafter.

Figure 2:
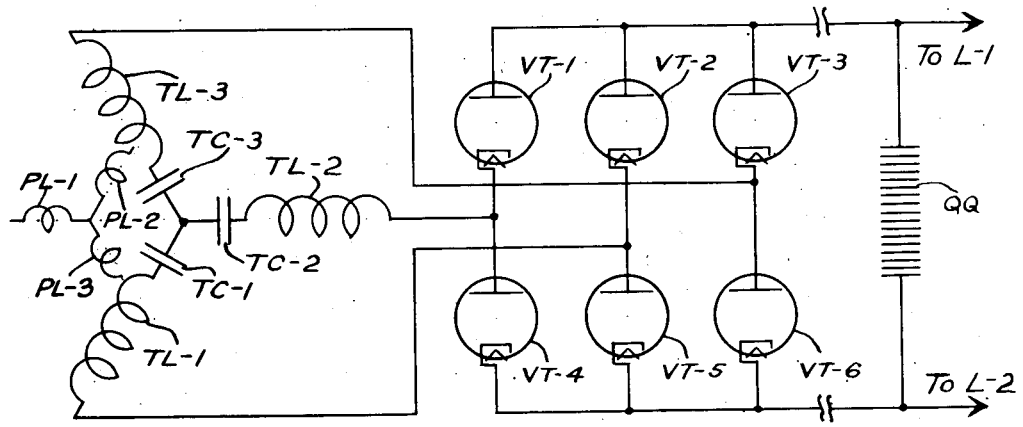

Referring to the drawing, Fig. 1 is a circuit diagram illustrating one embodiment of my invention, and Fig. 2 shows a further modification of my invention in connection with a multiphase supply voltage source.

With reference to Fig. 1, a transformer T, having a primary winding P, a secondary winding composed of the sections S-1 and S-2, and a core F is connected to deliver high voltage to a bridge type rectifier comprising vacuum or mercury vapor tubes V-1, V-2, V-3, and V-4. The transformer T is a saturable reactance type, and may have a long magnetic path between the primary and secondary windings, or of an equivalent type wherein the reactance of both windings is relatively high when the secondary winding is shorted. Normally a capacitor C is provided in series with the secondary windings S-1 and S-2, this capacitor functioning to correct the power factor of the transformer by arranging its value of capacitance in full or part resonance with the windings S-1 and S-2 at the supply frequency, thereby tending to give the rectifier system a constant power input.

The output of the rectifier is applied through a pair of inductively wound protective resistors R-1 and R-2 to the oscillatory circuit comprising the tunable inductors L-1 and L-2, the coupling capacitors C-1 and C-2, and the tank capacitor CT and the load inductor LT. A quenched spark gap Q is connected into the circuit as shown in Fig. 1. When alternating voltage is supplied across the winding P, a high alternating voltage is induced in the windings S-1 and S-2 either by the normal ratio of transformation as determined by the transformer turns ratio or through full or partial resonance of the secondary series capacitor C, or through both. The resulting high voltage is applied to the input of the bridge rectifier which supplies high rectified voltage to charge the coupling capacitors C-1 and C-2. The quenched spark gap Q, connected to discharge these capacitors, is adjusted to break down at a voltage equivalent to the peak voltage developed by the rectifier output. When the gap Q discharges, the rectifier output is momentarily partially short circuited, thereby reducing the transformer secondary voltage as well as the rectifier output voltage supplying the oscillatory circuit. Pulse trains are set up in the L—C circuit (the tank circuit provided by capacitor CT and the load inductor LT) each time the gap Q discharges. With the decay of each pulse train, the secondary windings S-1 and S-2 build up to their original high voltages when the gap Q stops its discharge, and thereafter the cycle of operation is repeated according to the circuit constants and the potential supplied to the coupling capacitors. Since the rectified voltage has substantially the same value each time a pulse train is initiated, the oscillatory circuit correspondingly produces pulse trains separated by comparatively equal intervals. The electrodes of the spark gap Q are set for the maximum peak voltage of the rectifier output so that a minimum of electrode consumption is obtained.

Fig. 2 illustrates a modification of my invention adapted to be operated from a three phase alternating current source. The windings PL-1, PL-2, and PL-3 represent the primary and the windings TL-1, TL-2, and TL-3 represent the secondary respectively of a three phase transformer similar in design to the single phase transformer mentioned above, and the windings TL-1, TL-2, and TL-3 normally are provided respectively with the series resonant capacitors TC-1, TC-2, and TC-3. The voltages from these windings are fed to a full wave rectifier composed of the six (6) electron tubes VT-1, VT-2, VT-3, VT-4, VT-5, and VT-6, which may be vacuum tubes or mercury vapor tubes of any suitable conventional type. The output of the rectifier is fed to an oscillatory circuit similar to that previously described having a similar quenched spark gap QQ. The operation of this circuit is precisely the same as the previously described single phase excited circuit; however, as might be expected, a better overall electrical efficiency is secured. A multi-phase system may be readily designed to be interchangeable with a single phase system so that the same oscillatory circuit can be energized by either power supply. It is quite obvious that not only great flexibility will result but also considerable savings will be thereby made in the manufacture of high frequency induction apparatus and the like.

While I have selected the particular embodiment shown and described as illustrative of my invention, it is understandable that various changes and substitutions and omissions may be made without departing from the scope and spirit of my invention. It is my intention, therefore, to be limited only as indicated by the scope of the claims which follow.

I, therefore, particularly point out and distinctly claim as my invention:

1. In combination a high reactance transformer having primary and secondary windings, a source of alternating voltage for the primary winding, a rectifier energized from the secondary winding, an oscillatory circuit including a quenched spark gap arranged to be energized from the said rectifier, and a capacitor connected into the said secondary winding for providing a resonance condition in the said winding to obtain a peak voltage coincident with the adjustment of gap break down potential.

2. In a power supply energized from an alternating voltage source, a high reactance transformer having its primary connected to the said source, a full wave rectifier connected to the secondary of the said transformer, an oscillatory circuit energized by the said rectifier, a capacitor in the said secondary for creating a resonance condition therein to derive a voltage of predetermined value across the rectifier output, and a quenched spark gap coupled to the said circuit, the said spark gap being adjusted to break down at a potential corresponding to the said predetermined value.

3. In an alternating current power supply system having a high reactance transformer energized from an alternating current supply source, a rectifier energized from the said transformer, a capacitor connected in series with one of the windings of the said transformer circuit for providing a resonance condition therewith, and means to load periodically the output of the said rectifier whereby wave trains separated by equal intervals are derived, the said loading means comprising a quenched spark gap and an oscillatory circuit wherein the gap is adjusted to discharge in accordance with the said resonance condition.

4. A rectified alternating current power supply system comprising a high reactance transformer having its primary energized from an alternating voltage supply, a full wave rectifier connected to the secondary winding of the transformer, an oscillatory circuit coupled to the said rectifier by a pair of capacitors, a spark gap connected with the said circuit to discharge the said capacitors thereby setting up oscillations in the said circuit, and a capacitor coacting with the secondary winding of the said transformer to produce a resonance therewith to furnish periodically a potential sufficient to charge the first said capacitors to break down the said gap.

5. In combination, a transformer having an appreciably long magnetic path between its primary and secondary windings, a capacitor connected with the secondary winding to obtain a resonance therewith, a rectifier supplied with potential from the said secondary winding, an oscillatory load circuit energized from the said rectifier when the said primary winding is provided with a suitable alternating supply voltage, and a quenched spark gap coupled to the said load circuit, the said gap being arranged to break down momentarily under the potential resulting from the said resonance to interrupt the circuit wherein oscillations are thereby set up.

6. A multiphase rectified alternating current power supply system comprising a transformer having a plurality of secondary windings, a corresponding plurality of primary windings, a full wave rectifier having its input energized from the said secondary windings, an oscillatory circuit connected to the output of the said rectifier, said circuit including a pair of capacitors and a spark gap, and a plurality of capacitors, one in each secondary winding, adapted for bringing about potentials at resonance with the windings corresponding to the break down voltage of the said gap.

7. A multiphase rectified alternating current power supply system comprising a transformer having a plurality of secondary windings, a corresponding plurality of primary windings, a full wave rectifier having its input provided from the said secondary windings, a plurality of capacitors, one in series with each said secondary winding, for producing peak potentials at resonance with said windings, and an oscillatory circuit forming the output for the said rectifier, said circuit including a pair of capacitors and a spark gap, the said gap being adjusted to break down under the said peak potentials.

OTTO WEITMANN.

REFERENCES CITED

The following references are of record in the file of this patent:

UNITED STATES PATENTS

| Number | Name | Date |
| --- | --- | --- |
| 1,168,541 | Myers | Jan. 18, 1916 |
| 1,896,647 | Pullwitt | Feb. 7, 1933 |

FOREIGN PATENTS

| Number | Country | Date |
| --- | --- | --- |
| 348,342 | Great Britain | May 14, 1931 |